US010834238B2

(12) United States Patent
Hinds

(10) Patent No.: US 10,834,238 B2
(45) Date of Patent: Nov. 10, 2020

(54) BLOCKCHAIN MANAGEMENT USING A DEVICE IN A WIRELESS TELECOMMUNICATION SYSTEM

(71) Applicant: Red Hat, Inc., Raleigh, NC (US)

(72) Inventor: Luke Anthony Hinds, Wiltshire (GB)

(73) Assignee: Red Hat, Inc., Raleigh, NC (US)

( * ) Notice: Subject to any disclaimer, the term of this patent is extended or adjusted under 35 U.S.C. 154(b) by 533 days.

(21) Appl. No.: 15/236,695

(22) Filed: Aug. 15, 2016

(65) Prior Publication Data
US 2018/0048738 A1 Feb. 15, 2018

(51) Int. Cl.
*H04N 21/438* (2011.01)
*H04L 29/06* (2006.01)
*H04W 80/04* (2009.01)
*H04L 9/32* (2006.01)
*H04L 1/00* (2006.01)
*H04W 16/32* (2009.01)
*H04W 88/08* (2009.01)
(Continued)

(52) U.S. Cl.
CPC ............ *H04L 69/08* (2013.01); *H04L 1/0018* (2013.01); *H04L 9/3236* (2013.01); *H04N 21/4384* (2013.01); *H04W 80/04* (2013.01); *H04L 2209/38* (2013.01); *H04L 2209/80* (2013.01); *H04L 2212/00* (2013.01); *H04W 16/32* (2013.01); *H04W 28/0236* (2013.01); *H04W 56/0055* (2013.01); *H04W 88/08* (2013.01)

(58) Field of Classification Search
CPC ...... G05B 2219/2241; G06F 2212/163; H04L 1/0018; H04N 21/4384; H04W 28/0236; H04W 56/0055
See application file for complete search history.

(56) References Cited

U.S. PATENT DOCUMENTS

2015/0058933 A1* 2/2015 Larson .............. H04L 29/12216
726/3
2015/0244690 A1* 8/2015 Mossbarger .......... H04L 63/061
713/171
(Continued)

OTHER PUBLICATIONS

Velasco-Castillo, Enrique, "Nine blockchain opportunities that telecoms operators should explore", Jun. 2016, pp. 1-3 (Year: 2016).*
(Continued)

*Primary Examiner* — Salvador E Rivas
(74) *Attorney, Agent, or Firm* — Kilpatrick Townsend & Stockton LLP

(57) ABSTRACT

Devices in a wireless telecommunication system can implement a blockchain that is distributed among the devices. For example, a base transceiver station of the wireless telecommunication system can receive, from a mobile device, a wireless radio communication that includes information associated with a blockchain transaction. The base transceiver station can convert the information associated with the blockchain transaction into an internet protocol (IP)-based format. The base transceiver station can update the blockchain by propagating the formatted information to other base transceiver stations of the wireless telecommunication system through an IP-based network that is internal to the wireless telecommunication system.

19 Claims, 5 Drawing Sheets

(51) Int. Cl.
   *H04W 56/00*   (2009.01)
   *H04W 28/02*   (2009.01)

(56) References Cited

U.S. PATENT DOCUMENTS

2016/0119839 A1* 4/2016 Komura ............... H04W 36/08
                                                   370/331
2016/0381558 A1* 12/2016 Caulfield .............. H04W 16/14
                                                   726/1
2017/0324738 A1* 11/2017 Hari .................... H04L 61/1511

OTHER PUBLICATIONS

Harpley, B., "5G and Fog Computing: close to the edge," 2016 http://www.astius.co.uk/2015/5g-fog-computing.
IBM, "Empowering the edge Practical insights on a decentralized Internet of Things" 2015.
Bieler, D., "Mobile Edge Computing Will Be Critical for Internet-Of-Things and Distributed Computing," 2016, http://blogs.forrester.com/dan_bieler/16-06-07-mobile_edge_computing_will_be_critical_for_internet_of things_and_distributed_computing.
Jolswarmadmin, "Thesis Proposal: Blockchain: From Bitcoin Cryptocurrency To Fog Computing Applications," 2015 http://jol.telecomitaila.com/jolswarm/en/proposta-di-tesi-blockchain-from-bitcoin-cryptocurrency-to-fog-computing-applications/.

* cited by examiner

BLOCKCHAIN MANAGEMENT USING A DEVICE IN A WIRELESS TELECOMMUNICATION SYSTEM

TECHNICAL FIELD

The present disclosure relates generally to telecommunications. More specifically, but not by way of limitation, this disclosure relates to managing a blockchain using a wireless telecommunication system.

BACKGROUND

A blockchain is a database that is distributed among multiple computing devices. A blockchain is formed from blocks, with each block having information related to a transaction and linking the block to a prior block in the chain. The computing devices can each have respective copies of the blockchain, so that no centralized or official copy of the blockchain exists and no computing device is trusted more than any other computing device. When a user initiates a transaction, some or all of the computing devices can verify the transaction. After verifying the transaction, the computing devices can include information related to the transaction into the respective copies of the blockchain. This can be more robust and secure than many other approaches.

DETAILED DESCRIPTION

Figure 1:
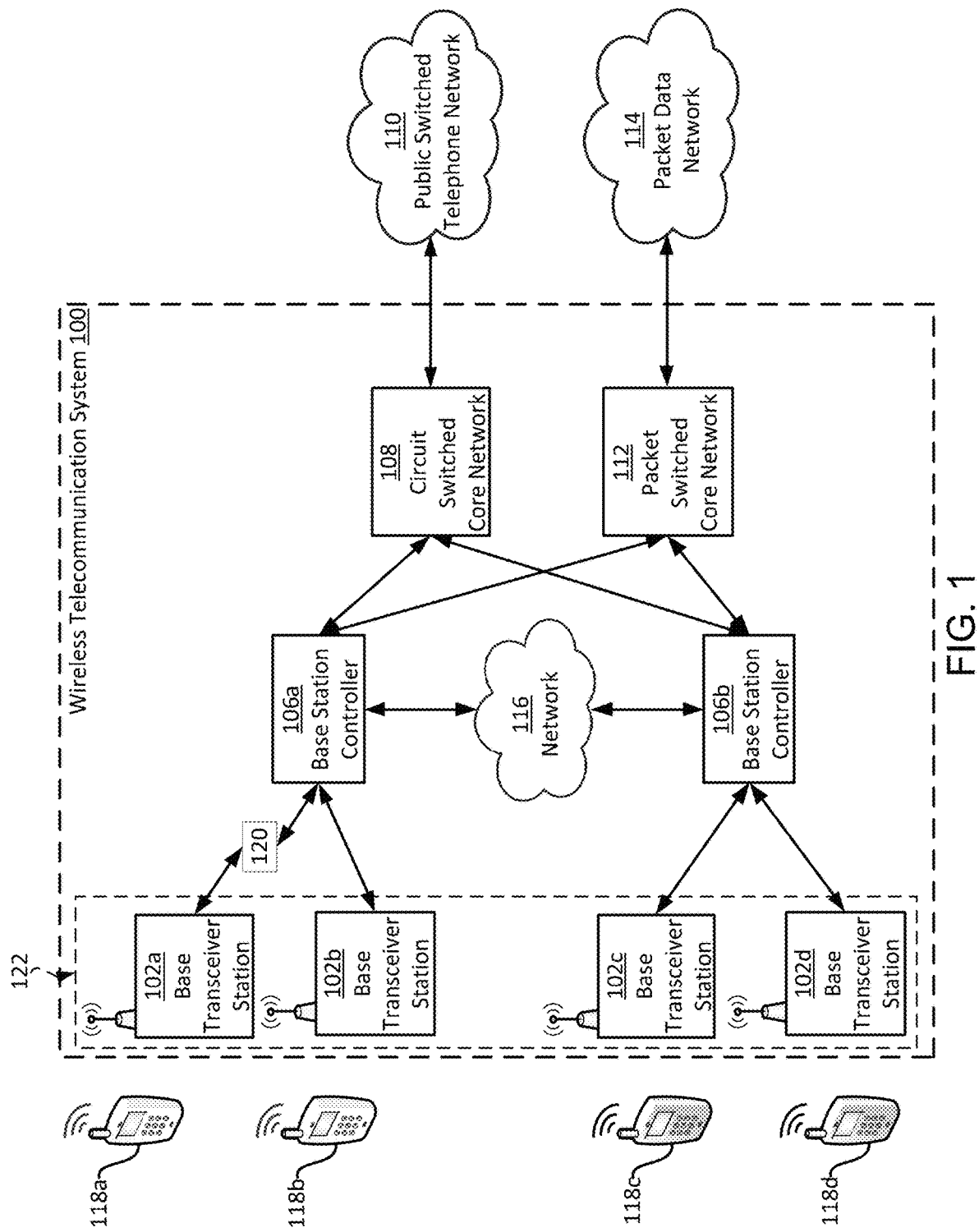
FIG. 1 is an example of a wireless telecommunication system that includes base transceiver stations for managing a blockchain according to some aspects.

Some blockchain implementations can have disadvantages. For example, some blockchain implementations can result in an undesirably high amount of latency when performing transactions. As a particular example, a mobile device may communicate information related to a transaction to a base transceiver station of a wireless telecommunication system, such as a mobile phone network. The information can be received by the base transceiver station, propagated through the wireless telecommunication network, and then propagated over the Internet to a server implementing the blockchain. This can take several hops and result in a large amount of latency, especially if the server is physically located far (e.g., on the other side of the world) from the mobile device. Further, because blockchains are decentralized, the server must then communicate information related to the transaction to other servers in other locations to verify the transaction. This can result in even more hops, and even more latency, before the transaction is finally verified and completed.

But some examples of the present disclosure can significantly reduce the amount of latency in a blockchain transaction. For example, a blockchain can be implemented by multiple base transceiver stations in the wireless telecommunication system, rather than using servers communicating over the Internet. Because the base transceiver stations can be physically located close to the mobile devices they serve, and can be the first link between the mobile devices and the rest of the wireless telecommunication system, base transceiver stations can be considered to be physically positioned at an edge (e.g., a physical edge) of the wireless telecommunication system. Physically positioning the base transceiver stations at the edge of the wireless telecommunication system can allow for mobile devices to directly communicate information related to transactions to the base transceiver stations, with no hops in-between. Further, the base transceiver stations can communicate the information related to the transactions among each other via a network that is internal to the wireless telecommunication system. Because the network can be implemented using the cables, routers, computing devices, and other components that physically form the wireless telecommunication system, the information can be communicated between the base transceiver stations with fewer hops (e.g., than if the information was communicated over the Internet). These factors can allow for blockchain transactions to be completed in fewer total hops, resulting in less overall latency.

Some examples of the present disclosure can also provide enhanced security for blockchain transactions. For example, servers that implement a blockchain over the Internet can be executing dozens or hundreds of programs, interacting with multiple servers and users, have more generic hardware and software, and can be more readily accessible. This ecosystem can be more difficult to secure against malicious attacks. But some examples of the present disclosure can implement the blockchain using hardware components of a wireless telecommunication system (e.g., rather than generic servers). These hardware components can be more specialized, execute significantly fewer programs, and have limited access to networks, such as the Internet, that are external to the wireless telecommunication system. It can be easier to prevent malicious attacks in such a controlled ecosystem.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is an example of a wireless telecommunication system 100 that includes base transceiver stations 102a-d for managing a blockchain according to some aspects. The wireless telecommunication system 100 can include a cellular network or other type of wireless communication network. The wireless telecommunication system 100 can use one or more wireless-network communication standards, such as the Global System for Mobile Communication (GSM) standard, the Universal Mobile Telecommunications System (UMTS) standard, the Long Term Evolution (LTE) standard, the Radio Access Network (RAN) standard, or any combination of these to communicate wirelessly with mobile devices 118a-d in a coverage area.

The base transceiver stations 102a-d can be positioned at different geographical locations for serving mobile devices 118a-d proximate to those geographical locations. Examples of the mobile devices 118a-d can include tablets, e-books, laptop computers, wearable devices, internet of things (IOT) devices, or other types of mobile devices. Because the base transceiver stations 102a-d can be positioned at a physical edge 122 of the wireless telecommunication system 100, the base transceiver stations 102a-d can receive information related to blockchain transactions directly from (e.g., without any intermediary electronic devices) the mobile devices 118a-d.

The base transceiver stations 102a-d can propagate information related to blockchain transactions to one another through a network 116, such as an internet protocol (IP)-based network. The network 116 can be internal to the wireless telecommunication system 100. The network 116 can be formed from cables, switches, routers, hubs, and other hardware components. These hardware components can form at least a portion of the physical architecture of the wireless telecommunication system 100.

The base transceiver stations 102a-d can be operated by base station controllers 106a-b. In some examples, the base station controllers 106a-b can include Radio Network Controllers (RNCs). The base station controllers 106a-b can communicate information from the base transceiver stations 102a-d to a circuit switched core network 108. The circuit switched core network 108 can include a mobile switching center, a mobile telephone switching office, or both of these for facilitating communication with a public switched telephone network 110 that is external to the wireless telecommunication system 100. The base station controllers 106a-b can additionally or alternatively communicate information from the base transceiver stations 102a-d to a packet switched core network 112. The packet switched core network 112 can include one or more gateways, such as a serving gateway packet radio service (GPRS) support node and a gateway GRPS support node, for facilitating communication with a packet data network 114, such as the Internet, that is external to the wireless telecommunication system 100.

Other implementations are also possible. For example, the base station controllers 106a-b can manage the blockchain. The base station controllers 106a-b can communicate information related to blockchain transactions to one another via the network 116. As another example, computing devices, such as computing device 120, that are positioned away from the physical edge 122 of the wireless telecommunication system 100 can manage the blockchain. The computing devices can each include a processor, a bus, and a memory device (e.g., similar to the components discussed with respect to FIG. 3), and can be positioned anywhere in the wireless telecommunication system 100. The computing devices can interact with one another via the network 116. Any number and combination of components shown in FIG. 1 can be used for managing the blockchain. Further, although the network 116 is depicted as being positioned between the base station controllers 106a-b, the network 116 can be positioned elsewhere in the wireless telecommunication system 100 and have other configurations.

Figure 2:
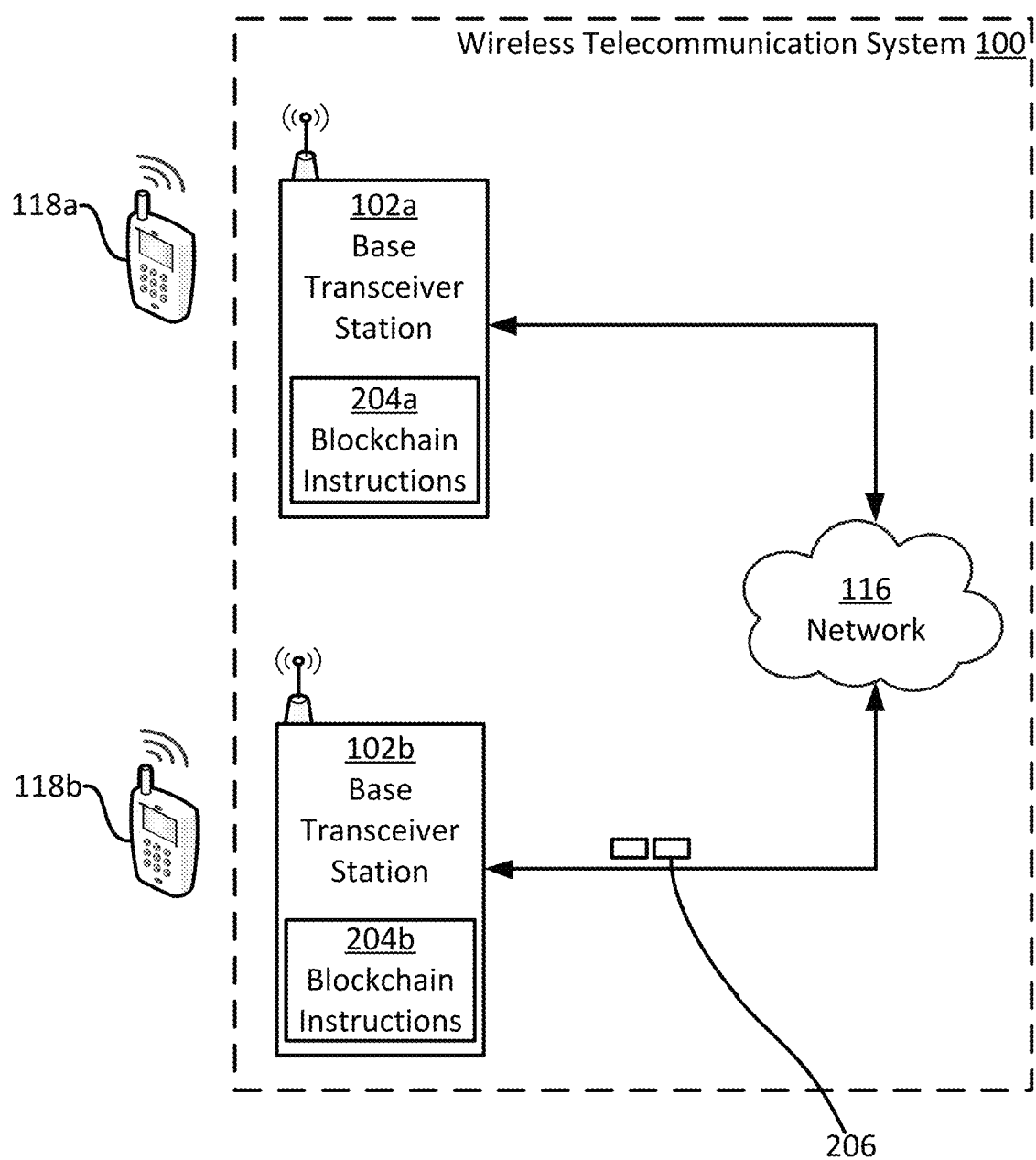
FIG. 2 is a block diagram of an example of a portion of a wireless telecommunication system that includes base transceiver stations for managing a blockchain according to some aspects.

FIG. 2 is a block diagram of an example of a portion of the wireless telecommunication system 100 that includes the base transceiver stations 102a-b for managing a blockchain according to some aspects. The base transceiver stations 102a-b are positioned at different geographical locations. The base transceiver stations 102a-b can include blockchain instructions 204a-b (e.g., program code) for managing the blockchain.

In some examples, the base transceiver station 102a can receive a wireless radio communication from the mobile device 118a. The wireless radio communication can include information associated with a blockchain transaction. For example, the wireless radio communication can include information about a monetary transaction between users of mobile devices 118a-b. The base transceiver station 102a can convert the information associated with the blockchain transaction into an IP-based format, or another format, usable with the network 116. The base transceiver station 102a can update a local copy of the blockchain and propagate the reformatted information 206 to the other base transceiver station 102b through the network 116.

Figure 3:
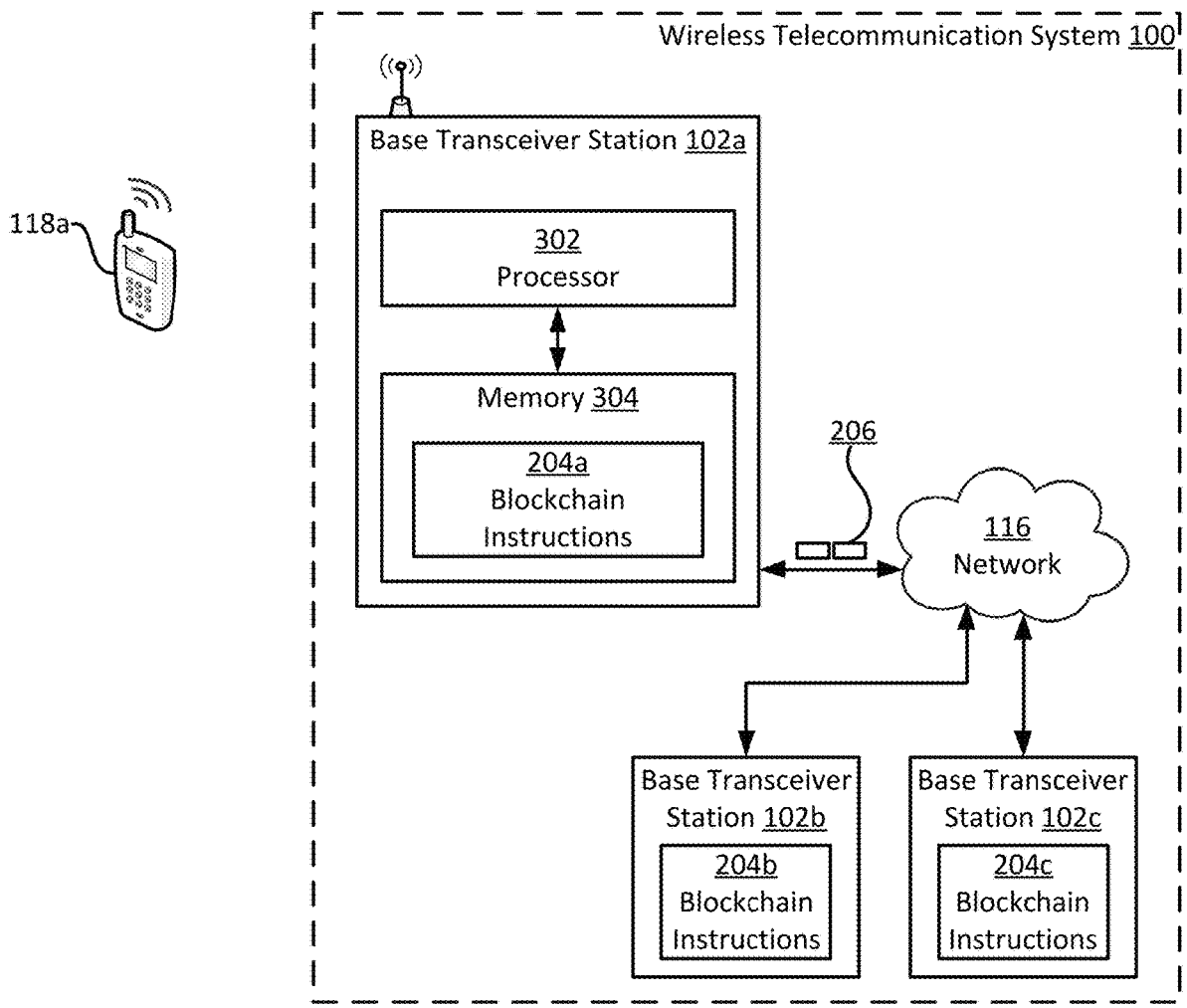
FIG. 3 is a block diagram of another example of a portion of a wireless telecommunication system that includes base transceiver stations for managing a blockchain according to some aspects.

FIG. 3 is another example of a portion of a wireless telecommunication system 100 that includes base transceiver stations 102a-c for managing a blockchain according to some aspects. In some examples, one or more of the base transceiver stations 102a-c can be a Node B device, such as an evolved Node B (eNodeB) device.

Each base transceiver station 102a-c can include a processor and a memory, such as processor 302 and memory 304. In some examples, the processor 302 and the memory 304 can be integrated into a single structure. For example, the processor 302 and the memory 304 can be within a single housing. In other examples, the processor 302 and the memory 304 be distributed (e.g., in separate housings) and in electrical communication with each other.

The processor 302 can execute one or more operations for implementing some examples. The processor 302 can execute instructions, such as blockchain instructions 204a, stored in the memory 304 to perform the operations. The processor 302 can include one processing device or multiple processing devices. Non-limiting examples of the processor 302 include a Field-Programmable Gate Array ("FPGA"), an application-specific integrated circuit ("ASIC"), a microprocessor, etc.

The processor 302 can be communicatively coupled to the memory 304. The non-volatile memory 304 may include any type of memory device that retains stored information when powered off. Non-limiting examples of the memory 304 include electrically erasable and programmable read-only memory ("EEPROM"), flash memory, or any other type of non-volatile memory. In some examples, at least some of the memory 304 can include a medium from which the processor 302 can read instructions, such as blockchain instructions 204a. A computer-readable medium can include electronic, optical, magnetic, or other storage devices capable of providing the processor 302 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The blockchain instructions 204a can cause the base transceiver station 102a to receive data associated with a wireless radio communication from a mobile device 118a. The data can include information related to a blockchain transaction. The blockchain instructions 204a can cause the base transceiver station 102a to convert the information into a format usable with the network 116 that is internal to a wireless telecommunication system 100. The blockchain instructions 204a can cause the base transceiver station 102a to propagate the reformatted information 206 to one or more other base transceiver stations 204b-c through the network 116 (e.g., for verifying the information or updating the blockchain). The base transceiver stations 204b-c can receive the reformatted information 206 and process the reformatted information 206 (e.g., using blockchain instructions 204b-c) to implement the blockchain.

Figure 4:
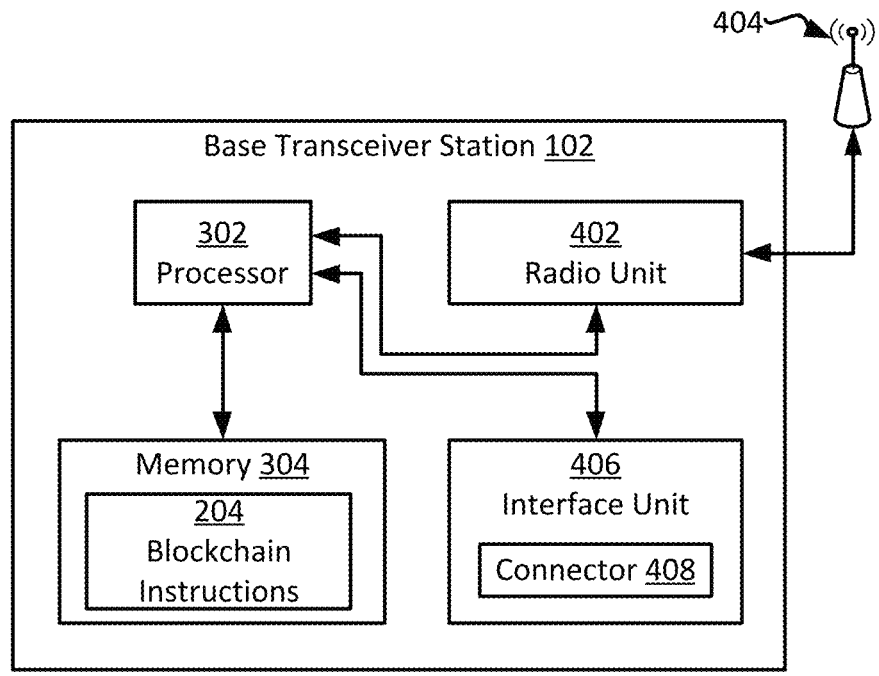
FIG. 4 is a block diagram of another example of a base transceiver station for managing a blockchain according to some aspects.

FIG. 4 is a block diagram of another example of the base transceiver station 102 for managing a blockchain according to some examples. The base transceiver station 102 can include the processor 302, memory 304, and blockchain instructions 204 discussed above.

The base transceiver station 102 can additionally or alternatively include other components. For example, the base transceiver station 102 can include a radio unit 402 coupled to an antenna 404 for facilitating wireless radio communications with mobile devices. The radio unit 402 can include a filter (e.g., a high pass, low pass, or band pass filter), a signal generator (e.g., an alternating current signal generator), an amplifier (e.g., an operational amplifier, tube, or transistor), a capacitor, a resistor, an inductor, an analog-to-digital converter, a digital-to-analog converter, an integrated circuit, another processor, or any combination of these. The radio unit 402 can operate the antenna 404 to transmit and receive wireless radio communications.

In some examples, the base transceiver station 102 can include an interface unit 406 for communicating with other components of the wireless telecommunication system. The interface unit 406 can enable the base transceiver station 102 to communicate with the other components of the wireless telecommunication system 100 using a wired protocol (e.g., Ethernet, USB, or IEEE 1394) or a wireless protocol (e.g., Bluetooth or 802.11). In some examples, the interface unit 406 can include a connector 408 for physically connecting to a cable to enable wired communication with other components of the wireless telecommunication system. For example, the connector 408 can include an Ethernet port for physically connecting to an Ethernet cable that forms at least a portion of an internal network (e.g., network 116) of the wireless telecommunication system. Additionally or alternatively, the interface unit 406 can include an antenna for wirelessly communicating with other components of the wireless telecommunication system.

Figure 5:
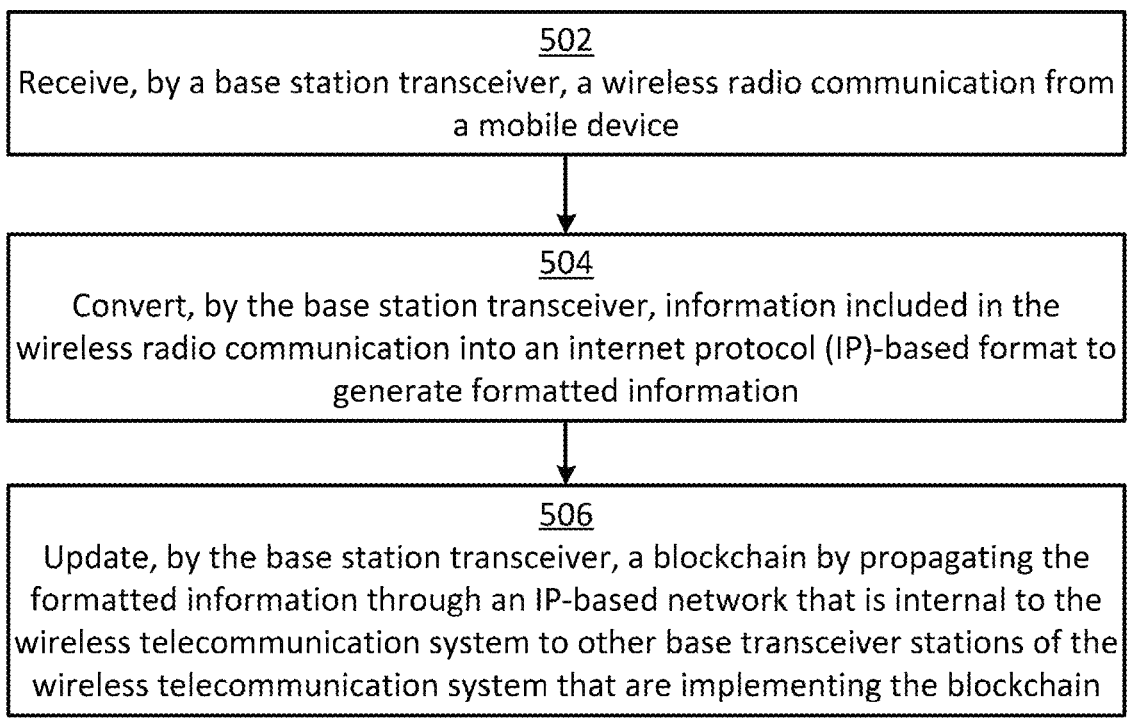
FIG. 5 is a flow chart showing an example of a process for using a base transceiver station to manage a blockchain according to some aspects.

FIG. 5 is a flow chart showing an example of a process for using a base transceiver station to manage a blockchain according to some aspects. Some examples can include more, fewer, or different steps than the steps depicted in FIG. 5. The steps below are described with reference to components described above with regard to FIGS. 1-4.

In block 502, a base transceiver station 102a receives a wireless radio communication from a mobile device 118a. The base transceiver station 102a can receive the wireless radio communication via an antenna 404 and a radio unit 402. The wireless radio communication can be in a radio-frequency band designated to the base transceiver station 102a by a base station controller 106a. The wireless radio communication can include encoded or modulated data associated with a blockchain transaction.

In block 504, the base transceiver station 102a converts information included in the wireless radio communication into an IP-based format to generate formatted information. The information can be related to a blockchain transaction. In some examples, the base transceiver station 102a can convert the information into the IP-based format by encapsulating the information into data packets having IP headers. Additionally or alternatively, the base transceiver station 102a can convert the information into another format (e.g., by encapsulating the information into data packets having other header information).

In block 506, the base transceiver station 102a updates a blockchain by propagating the formatted information through an IP-based network (e.g., network 116) that is internal to the wireless telecommunication system 100 to other base transceiver stations 102b-d of the wireless telecommunication system 100 that are implementing the blockchain. For example, the base transceiver station 102a can transmit, via the IP-based network, IP packets that include destination addresses associated with the base transceiver stations 102b-d. The base transceiver stations 102b-d can receive the IP packets, extract the information from the IP packets, and update respective copies of the blockchain using the information.

Figure 6:
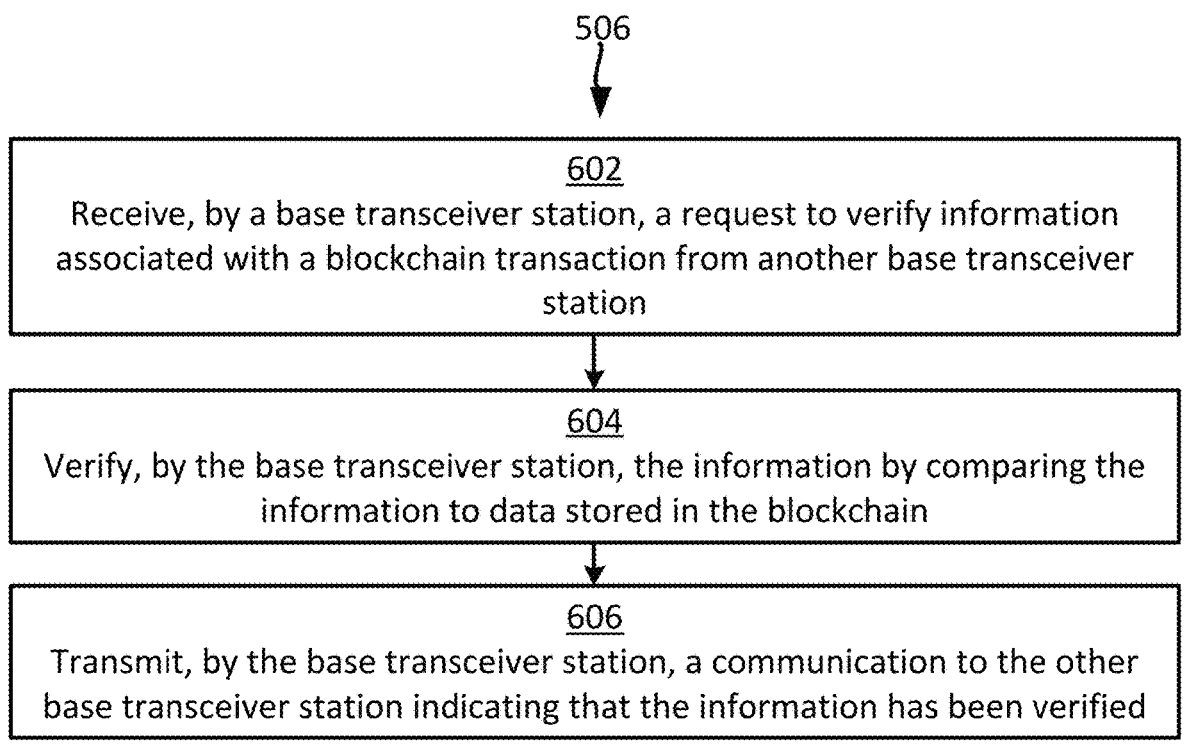
FIG. 6 is a flow chart showing an example of a process for using a base transceiver station to update a blockchain according to some aspects.

FIG. 6 is a flow chart showing an example of a process for using a base transceiver station to update a blockchain according to some aspects. Some examples can include more, fewer, or different steps than the steps depicted in FIG. 6. The steps below are described with reference to components described above with regard to FIGS. 1-4.

In block 602, a base transceiver station 102a receives a request to verify information associated with a blockchain transaction from another base transceiver station 102b. For example, a mobile device 118b can communicate information related to the blockchain transaction to the base transceiver station 102b. The base transceiver station 102b can receive the information and transmit, via the network 116, a request to verify the information to base transceiver station 102a. The base transceiver station 102a can then receive the request.

In block 604, the base transceiver station 102a verifies the information by comparing the information to data stored in the blockchain. The base transceiver station 102a can verify the information in response to the request from the other base transceiver station 102b.

In one example, the information can include an indicator (e.g., a hash value, number, or other designator) of a prior block in the blockchain. The base transceiver station 102a can compare the indicator to data stored in a local copy of the blockchain to ensure the indicator is correct. If the indicator is associated with the correct, prior block in the blockchain, the base transceiver station 102a can determine that the information is correct. Otherwise, the base transceiver station 102a may determine that the information is incorrect.

In block 606, the base transceiver station 102a transmits a communication to the base transceiver station 102b indicating that the information has been verified or that the information has an error and cannot be verified. For example, the base transceiver station 102a can transmit the communication via the network 116 to the base transceiver station 102b. The base transceiver station 102b can receive the communication and determine, based on the communication, that the information has been verified (or has an error).

Although FIGS. 5-6 are described with respect to the base transceiver station 102a performing the steps, in some examples, other components of the wireless telecommunication system 100 can additionally or alternatively perform some or all of the steps described above. For example, a computing device 120, a base station controller 106a, another base transceiver station 102b, or any combination of these can perform at least some of the steps described above.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A cellular network comprising:
    base transceiver stations that are positionable at physical edges of the cellular network for communicating with mobile devices,
    wherein the base transceiver stations are communicatively coupled to one another over an internal Internet-protocol (IP) network that is accessible to the base transceiver stations through separate base-station controllers and that is formed from components internal to the cellular network, and
    wherein the base transceiver stations each comprise executable instructions for collectively implementing a blockchain that is executed at the physical edges of the cellular network and distributed among the base transceiver stations over the internal IP network to reduce an amount of latency associated with corresponding blockchain transactions,
    each base transceiver station of the base transceiver stations being configured to implement the blockchain by:
        receiving, from a respective mobile device, a respective wireless radio communication that includes information associated with a respective transaction to be included in the blockchain;
        converting the information associated with the respective transaction into an IP-based format to generate formatted information that is communicable over the internal IP network of the cellular network; and
        updating the blockchain by propagating the formatted information to another base transceiver station among the base transceiver stations in the cellular network through the internal IP network of the cellular network.

2. The cellular network of claim 1, wherein the base transceiver stations include Evolved Node B devices and the cellular network is a Long Term Evolution Radio Access Network.

3. The cellular network of claim 1, wherein each base transceiver station of the base transceiver stations comprises a processing device and a memory device on which the instructions are stored for causing the processing device to convert the information into the IP-based format by encapsulating the information into one or more IP packets.

4. The cellular network of claim 1, wherein each base transceiver station of base transceiver stations comprises:
    an antenna and a radio unit for receiving wireless radio communications from mobile devices; and
    a connector for physically coupling to a cable forming at least a portion of the internal IP network of the cellular network.

5. The cellular network of claim 1, wherein the base transceiver stations are positioned at the physical edges of the cellular network for directly communicating with the mobile devices.

6. The cellular network of claim 1, wherein each base transceiver station of the base transceiver stations comprises a processing device and a memory device on which the instructions are stored for causing the processing device to:
    receive, from another base transceiver station and via the internal IP network, a request to verify the information associated with the respective transaction;
    based on the request, verify the information associated with the respective transaction by comparing the information to data stored in the blockchain; and
    transmit a communication to the other base transceiver station indicating that the information has been verified.

7. The cellular network of claim 1, wherein the internal IP network excludes the Internet.

8. The cellular network of claim 1, wherein the internal IP network is entirely formed from the components internal to the cellular network.

9. A base transceiver station of a cellular network, the base transceiver station being positionable at a physical edge of the cellular network for communicating with a mobile device, the base transceiver station comprising:
    a processing device; and
    a memory device on which instructions are stored for implementing a blockchain at the physical edges of the cellular network and in concert with a plurality of other base transceiver stations of the cellular network to reduce an amount of latency associated with corresponding blockchain transactions, the instructions being configured for causing the processing device to:
        receive information associated with a wireless radio communication from the mobile device;
        convert the information into an internet protocol (IP)-based format to generate formatted information; and
        update the blockchain by propagating the formatted information to the plurality of other base transceiver stations that also include executable instructions for implementing the blockchain,
    wherein the base transceiver station is configured to propagate the formatted information to the plurality of other base transceiver stations over an IP-based network that is accessible to the base transceiver station through a separate base-station controller and that is formed from components internal to the cellular network.

10. The base transceiver station of claim 9, wherein the base transceiver station includes an Evolved Node B device and the cellular network includes a Long Term Evolution Radio Access Network.

11. The base transceiver station claim 9, wherein the memory device further includes instructions executable by the processing device for causing the processing device to convert the information into the IP-based format by encapsulating the information into one or more IP packets.

12. The base transceiver station claim 9, wherein the base transceiver station is positioned at a physical edge of the cellular network.

13. The base transceiver station claim 9, wherein the memory device further includes instructions executable by the processing device for causing the processing device to:
    receive, from another base transceiver station and via the IP-based network, a request to verify the information;
    based on the request, verify the information by comparing the information to data stored in the blockchain; and
    transmit a communication to the other base transceiver station indicating that the information has been verified.

14. A method comprising:
    receiving, by a base transceiver station that is positioned at a physical edge of a cellular network, a wireless radio communication from a mobile device;

converting, by the base transceiver station, information included in the wireless radio communication into an internet protocol (IP)-based format to generate formatted information; and updating, by the base transceiver station, a blockchain executing at physical edges of the cellular network and formed by a plurality of base transceiver stations of the cellular network, wherein the blockchain is executing at the physical edges of the cellular network to reduce an amount of latency associated with corresponding blockchain transactions, wherein the base transceiver station updates the blockchain by propagating the formatted information to other base transceiver stations of the plurality of base transceiver stations that are implementing the blockchain, and wherein the base transceiver station propagates the formatted information to the other base transceiver stations over an IP-based network that is formed from components internal to the cellular network by accessing the IP-based network through a separate base-station controller.

15. The method of claim 14, wherein the base transceiver station is an Evolved Node B device and the cellular network is a Long Term Evolution Radio Access Network.

16. The method of claim 14, further comprising:
converting the information included in the wireless radio communication into the IP-based format by encapsulating the information into one or more IP packets.

17. The method of claim 14, wherein:
the base transceiver station receives the wireless radio communication directly from the mobile device.

18. The method of claim 14, further comprising:
receiving, from another base transceiver station and via the IP-based network, a request to verify the information included in the wireless radio communication;

based on the request, verifying the information by comparing the information to data stored in the blockchain; and transmitting a communication to the other base transceiver station indicating that the information has been verified.

19. The method of claim 14, wherein the IP-based network excludes the Internet.

\* \* \* \* \*